United States Patent [19]

Yamanaka

[11] Patent Number: 4,614,245
[45] Date of Patent: Sep. 30, 1986

[54] DEVICE FOR MEASURING FORCE

[75] Inventor: Masami Yamanaka, Miki, Japan

[73] Assignee: Yamato Scale Company, Limited, Japan

[21] Appl. No.: 724,270

[22] Filed: Apr. 17, 1985

Related U.S. Application Data

[63] Continuation of Ser. No. 537,037, Sep. 29, 1983.

[30] Foreign Application Priority Data

Oct. 5, 1982 [JP] Japan .................. 57-175456
Dec. 20, 1982 [JP] Japan .............. 57-193771[U]
Jan. 17, 1983 [JP] Japan .................. 58-4989[U]

[51] Int. Cl.$^4$ .................. G01G 3/14; G01G 3/08
[52] U.S. Cl. .................. 177/210 FP; 177/229; 177/DIG. 5
[58] Field of Search ............ 177/210 FP, 229, DIG. 5

[56] References Cited

U.S. PATENT DOCUMENTS

| | | | |
|---|---|---|---|
| 3,712,395 | 1/1973 | Streater et al. | 177/210 FP |
| 3,786,883 | 1/1974 | Kunz | 177/210 FP X |
| 3,897,681 | 8/1975 | Meier | 177/210 FP X |
| 4,300,648 | 11/1981 | Gallo et al. | 177/229 |
| 4,308,929 | 1/1982 | Estavoyer | 177/229 X |
| 4,366,875 | 1/1983 | Dauge et al. | 177/210 FP X |

FOREIGN PATENT DOCUMENTS 43-18665 8/1978 Japan .
54-30863 2/1979 Japan .

Primary Examiner—George H. Miller, Jr.
Attorney, Agent, or Firm—Senniger, Powers, Leavitt and Roedel

[57] ABSTRACT

A device for measuring force, which is preferably applicable to a weighing device, is provided, wherein two cantilever arms are arranged substantially in parallel and generally in a vertical plane, an elastic member is coupled between the free ends of the both arms so as to be subjected to tension or compression when a force to be measured is applied to the free end of the either arm, the elastic member forms a part of mechano-electric transducer which produces an electric signal whose feature has a theoretical relationship with the applied force, and the device further includes an arithmetic unit for calculating the force in accordance with this relationship.

5 Claims, 10 Drawing Figures

DEVICE FOR MEASURING FORCE

This is a continuation, of application Ser. No. 537,037, filed Sept. 29, 1983.

This invention relates to a novel device for measuring a force and, especially, to such device in which the force is converted into an electric signal. This device is preperably applicable to a weighing device.

A typical example of this kind of device is a so-called load cell. In a typical load cell, a resistive strain gauge is adhered to a surface of an elastic member which deforms when subjected to the force, and resistance variation of the strain gauge is measured to obtain the magnitude of force. An example of such a load cell device is disclosed as a weighing device in the opened Japanese utility model specification No. 54-30863. This type of device can measure forces over a wide range by suitable selecting geometry of the elastic member. However, it has suffered from a large error due to thermal change of physical properties, such as elastic and expansion coefficients, of the elastic member and humidity decay of adhesion of the strain gauge, which are very difficult and expensive to compensate for. Japanese patent publication No. 43-18665 discloses a force measuring device using a thoretical relation between tension and frequency of vibration of a string. Though this device exhibits high accuracy in measurement, it has such disadvantages as complicated structure and relatively narrow range of measurement.

Therefore, an object of this invention is to remove the abovementioned disadvantages of the prior art devices and provide an improved device which can measure forces at high accuracy over a wide range.

This object can be attained in accordance with this invention which provides a device for measuring a force comprising first and second cantilever elastic members having one end fixed and being arranged substantially parallel to each other, a third elastic member coupled between the free ends of the first and second members, means of applying the force to be measured to one of said free ends, and means of detecting a force applied to the third member due to application of the former force.

These and other objects and features of this invention will be made clear by the following description with reference to the accompanying drawings.

In the drawings.

Throughout the drawings, the same reference numerals are given to like or corresponding structural components.

Figure 1:
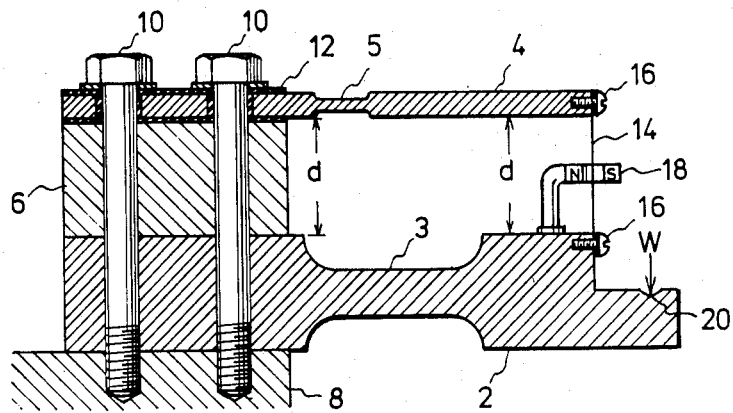
FIG. 1 is a sectional side view representing a typical embodiment of this invention.

Referring to FIG. 1, a main elastic member 2 and an auxiliary elastic member 4 are arranged in parallel relationship and each having one end fixed through an intervening block 6 to a stationary base 8 by bolts 10, so that both members 2 and 4 are supported in cantilever fashion. The auxiliary member 4 is electrically isolated from the other components by insulator materials 12. Both elastic members 2 and 4 have thinned portions 3 and 5, respectively, which will be called "deformable portions" hereinunder and in which strains are concentratedly induced when a force is applied to the free ends thereof. Between the free ends of both members 2 and 4 is stretched an elastic metal string 14 having an effective length d which is substantially equal to the thickness of the intervening block 6, as shown. The string 14 is fixed to the free ends of the members 2 and 4 by screws 16. A permanent magnet 18 supported at the end of the main elastic member 2 is disposed midway of the string 14 with the string between both magnetic poles of the magnet so that the string 14 is subjected to a magnetic field orthogonal thereto.

Figure 2:
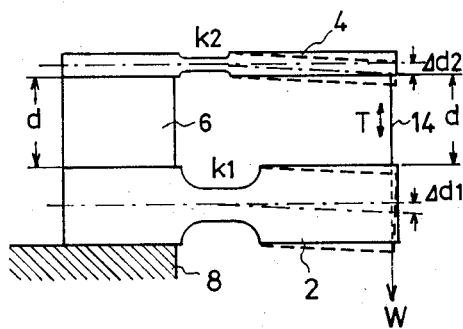
FIG. 2 is a diagram for aiding explanation of the theory of the embodiment of FIG. 1.

When a load W is applied downwards to the end of the main elastic member 2 at a point 20 as shown by an arrow in FIGS. 1 and 2, it produces a deflection $\Delta d_1$ of the main member 2, which is proportional to the load W, to pull the lower end of the string 14 downwards. This results in a tension T of the string 14 which produces a deflection $\Delta d_2$ of the auxiliary member 4. If the spring constants of the elastic members 2 and 4 are $k_1$ and $k_2$, respectively, and the elongation of the string 14 is neglected, then, $$\begin{aligned}&\Delta d_1 = \Delta d_2 = \Delta d\\&W = \Delta d(k_1 + k_2)\\\text{and }&T = \Delta d k_2\\\text{Therefore, }&W = T(k_1 + k_2)/k_2\end{aligned} \quad (1)$$

This means that load W and tension T are in mutually proportional relationship and the load W can be obtained by measuring the tension T.

Figure 3:
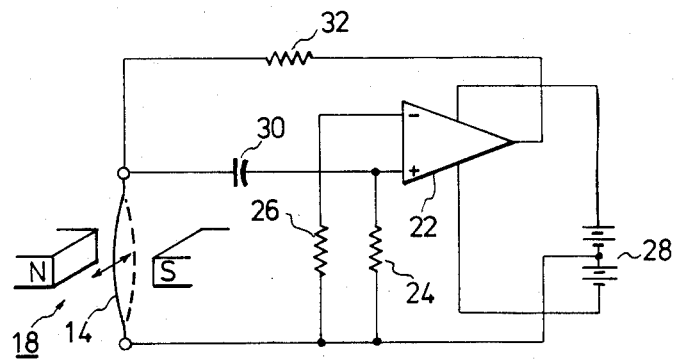
FIG. 3 is a schematic diagram representing a circuit for deriving vibration of a string in the embodiment of FIGS. 1 and 2 as an electric signal.

As shown in FIG. 3, the lower end of the string 14 is connected to first and second inputs of a differential amplifier 22 through resistors 24 and 26, respectively, and to a reference potential point 28. The upper end of the string 14 is coupled through a capacitor 30 to the first input of the amplifier 22 and the output of the amplifier 22 is connected through a resistor 32 to the upper end of the string 14.

In this arrangement, if the string 14 deflects slightly, in one direction across the magnetic field of the permanent magnet 18, a small current will be induced in one direction in a closed circuit including the elements 14, 24 and 30 to produce a voltage across the resistor 24. This voltage is amplified by the amplifier 22 and the amplified output is applied through the resistor 32 to the string 14 in the direction of further increasing the deflection thereof. When an equilibrium is obtained between the mechanical and electrical energies applied to the string 14, the string ceases to increase its deflection and begins to deflect in the opposite direction, thereby inverting the current flow. Thereafter, similar actions are repeated to cause a forced vibration of the string 14 at frequency f. This frequency f is given approximately by the following equation, as shown in O. Nishino "KOGYO DENSHI KISOKU (Industrial Electronic Measurement)", p. 51, published by Corona Inc., Tokyo, 1965.

$$f = (n/2d)\sqrt{Tg/m} \qquad (2)$$

where n is the order of higher harmonic, d is effective length of the string 14, g is the acceleration of gravity and m is mass per unit length of the string 14. Therefore, the tension T can be obtained by measuring the frequency f.

Figure 4:
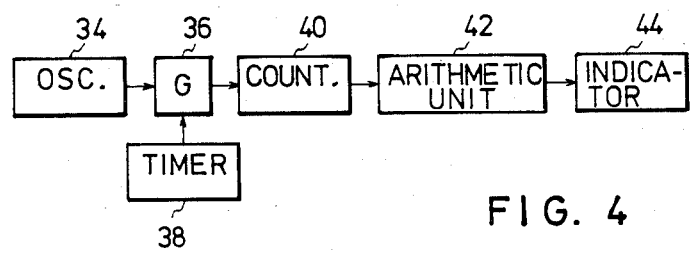
FIG. 4 is a block diagram representing a typical circuit for processing the signal derived by the circuit of FIG. 3.

FIG. 4 shows an embodiment of circuit for detecting the frequency and calculating the load applied to the device of FIG. 1. The circuit comprises an oscillator 34 which includes the circuit of FIG. 3 and provides an oscillation signal of frequency f. The oscillation signal is applied through a gate 36 controlled by a timer 38 to a counter 40 which counts the number of cycles of the applied oscillation signal for a predetermined time preset in the timer 38. The counter 40 provides its count output to an arithmetic unit 42 which may be a microcomputer and calculates frequency f from the input count and the preset time and then tension T and load W in accordance with the equations (2) and (1) in turn. An indicator 44 indicates or displays the result of calculation.

In order to improve accuracy or resolution of measured load W in this arrangement, it is necessary to increase the output count of the counter 40. To this end, the output frequency of the oscillator 34 or the gating time of the gate 36 may be increased. However, it is limited to increase the frequency f by reducing the length d of the string 14 and it is undesirable to increase the time for measurement by increasing the gating time.

Figure 5:
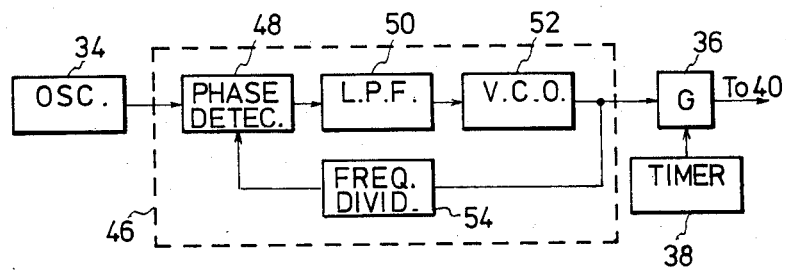
FIG. 5 is a block diagram representing a circuit improved over the circuit of FIG. 4 in accordance with this invention.

FIG. 5 is a modification of the circuit of FIG. 4, which can attain the abovementioned object with no change in the string and gating time. In FIG. 5, a phase locked loop (PPL) frequency multiplier 46, as shown by dashed block, is inserted between oscillator 34 and gate 36 or the circuit of FIG. 4. As shown, PPL frequency multiplier 46 includes phase detector 48, low-pass filter 50 and voltage controlled oscillator 52 coupled in series between oscillator 34 and gate 36, and frequency divider 54 coupled between the output of ocsillator 52 and the second input of phase detector 48.

In this arrangement, oscillator 34 produces a signal of frequency f, voltage controlled oscillator 52 is preset to produce a signal of frequency near Nf and frequency divider 54 has dividing factor N. Accordingly, the output frequency of the frequency divider 54 is initially near f. The phase detector 48 compares in phase the output signals of oscillator 34 and frequency divider 54 and produces a voltage indicative of the phase difference therebetween. This voltage is filtered by low-pass filter 50 for removing the a.c. component and applied to voltage controlled oscillator 52. The oscillator 52 is arranged to control its output frequency to the direction of decreasing its input voltage and, therefore, it tends to produce a frequency exactly equal to Nf. This means that it is possible to obtain N-times resolution of the circuit of FIG. 4 with the same measurement time or to reduce the measurement time by factor N with the same resolution.

Though the device of this invention should not be affected by humidity and does not require any expensive moisture sealing structure in contrast to the prior art device using strain gauges adhered to the deformable portions, it is likely to be affected by temperature change. One of the possible effects is thermal expansion of the string 14, which changes its tension T to introduce significant error in measurement. This effect can be cancelled by making the thickness of the intervening block 6 substantially equal to the effective length d of the string 14, as shown in FIGS. 1 and 2, and also making both block 6 and string 14 from materials having substantially same linear thermal expansion coefficient.

Another possible thermal effect is variation in the spring constants $k_1$ and $k_2$ of both elastic members 2 and 4, which may result in a change of proportional constant $(k_1+k_2)/k_2$ of Equation (1). However, it has been found that the value of this proportional constant can be left apparently unchanged by making both members 2 and 4 from the same material or from materials having the same thermal coefficient of elastic modulus and by compensating thermal change of geometry with zero-point correction.

Even in the absence of temperature change, some errors may be caused by residual strain and creep of the members 2 and 4. However, these errors can be avoided by designing the deformable portions of the both members 2 and 4 so that the maximum stresses therein are substantially the same in magnitude and making both members from the same material, since both residual strain and creep are functions of stress, which is peculiar to the material used.

It can be seen from Equation (1) that tension T can be conserved regardless of the magnitude of W by suitably selecting the spring constant $k_1$ of the main elastic member 2 only. This means that the range of measurement of the inventive device can be established arbitrarily by only changing the geometry of the deformable portion 3 of the main member 2, leaving the other components, such as auxiliary member 4 and string 14, as they are.

Although the above description has been made in conjuction with an embodiment in which a vibratory string cooperating with a permanent magnet is used as a mechanoelectric transducer, this invention is not limited to this embodiment. Any type of transducer, which can convert a mechanical force into an electrical oscillation having a frequency relating to the applied force, can be used instead of the abovementioned string structure. Examples of such alternatives include crystal transducers as described in the article of Y. Nishiguchi entitled "Vibratory Electronic Balances", KEIRYO KANRI (Weight Measurement Control), vol. 32, No. 4 (1983) pp. 10-13, and tuning fork transducers as described in the same article, pp. 15-16.

Figure 6:
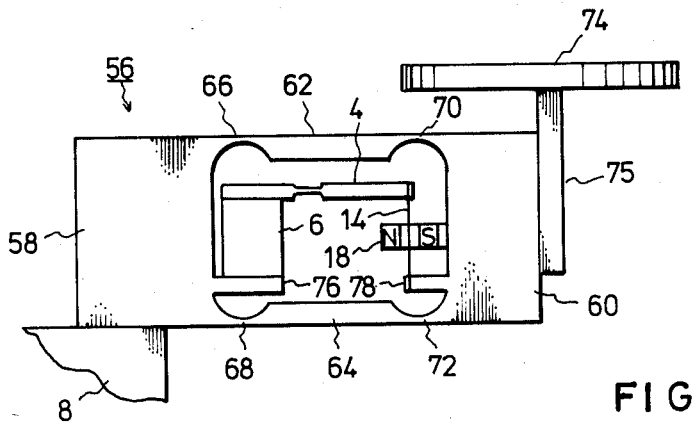
FIGS. 6 through 10 are schematic side views representing some embodiments of weighing device in which the device of this invention is embodied.
Figure 7:
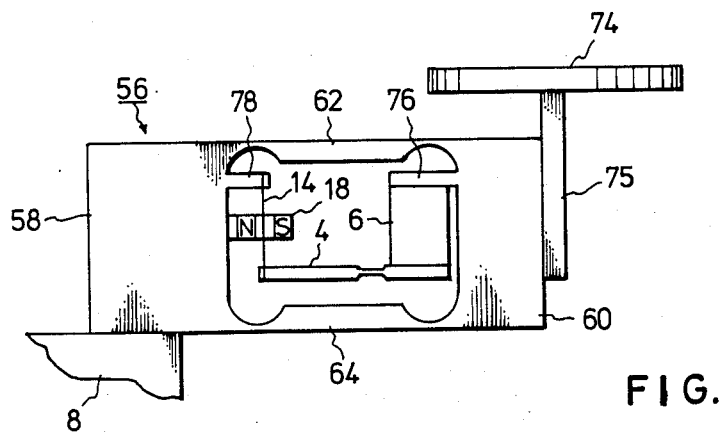
Figure 8:
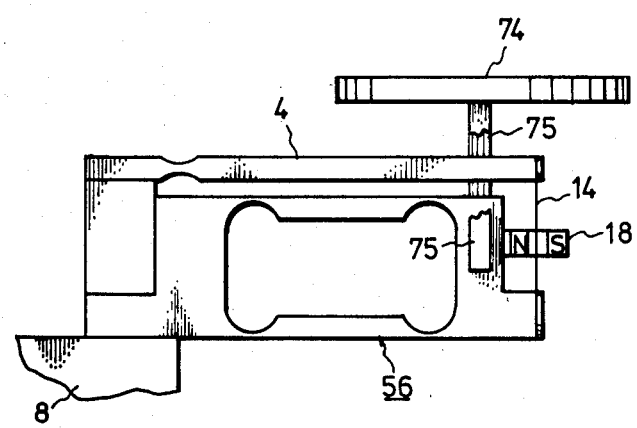
Figure 9:
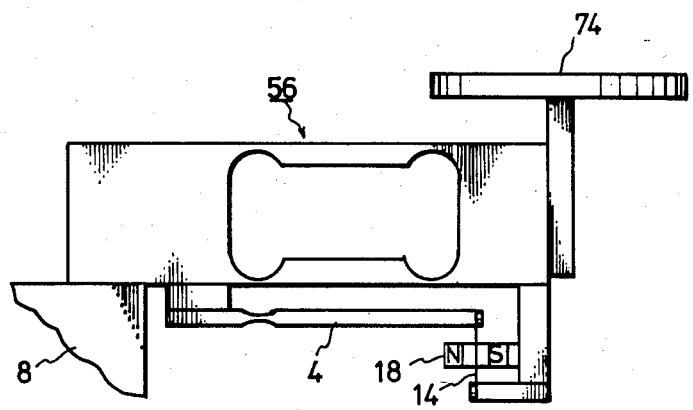
Figure 10:
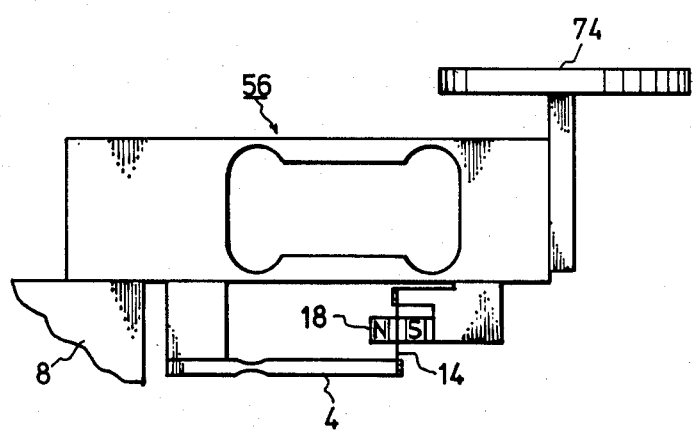

FIG. 6 shows a weighing balance in which a modification of the device of FIGS. 1 and 2 is used for measuring weight. The balance includes a parallelogramic mechanism 56, which is generally referred to as "Roberval mechanism", as what serves a function of the main elastic member 2 of the device of FIGS. 1 and 2. The parallelogramic mechanism 56 includes a pair of vertical members 58 and 60 and a pair of horizontal members 62 and 64 which are coupled through four elastically deformable portions 66, 68, 70 and 72. The vertical member 58 is fixed to a stationary bracket 8 of the balance and the vertical member 60 is coupled rigidly to a weighing cradle 74 through a support rod 75, so that the cradle 74 can move vertically with the vertical member 60. A rigid arm 76 extends horizontally from the inner face of the vertical member 58 and an auxiliary elastic member 4, which is similar to that of FIGS. 1 and 2, is fixed thereto through an intervening block 6 so as to lie in the plane of parallelogramic mechanism 56. Another rigid arm 78 extends horizontally from the inner face of the vertical member 60 and a metal string 14 is stretched vertically between the free ends of elastic member 4 and arm 78. A permanent magnet 18 is attached to the vertical member 60 with the string 14 disposed between the both magnetic poles of the magnet. Though not shown in the drawing, a frequency detecting and weight calculating circuit similar to that of FIG. 4 or 5 is coupled to both ends of the string 14. As the operation of this weighing balance is selfexplanatory from the description of the device of FIGS. 1 and 2, no further description will be made about it.

FIGS. 7 through 10 show some modifications of the structure of FIG. 6. While they are similar in both structure and operation as readily understood from the drawings, the structure of FIG. 10 differs a little from the others in that the initial tension of the string 14 is reduced by the weight on the cradle 74 and frequency reduction proportional to the weight will be detected. These modifications belong to the matter of design for accomodating itself to the user's demand, such as range of measurement, compactness and appearance of the product, and are within the scope of this invention.

I claim:

1. A device for measuring a force, comprising first and second cantilever-type elastic members fixed at one of their respective ends and arranged in parallel spaced relationship, a spacer member between the fixed ends of said elastic members, a metal wire stretched between the free ends of said elastic members, means for applying the force to be measured to the free end of said first elastic member, means for converting vibration of said metal wire into electrical oscillation, means for measuring the frequency of said oscillation, and arithmetic means for calculating said force from said frequency; wherein said spacer member and said metal wire are made of materials having substantially the same linear expansion coefficient and have substantially the same effective dimension in the longitudinal direction of said metal wire, and wherein said first and second elastic members are made of materials having substantially the same temperature coefficients of elastic modulus.

2. The device, as set forth in claim 1, wherein said first and second elastic members have portions adapted to be subjected to concentrated strains, respectively, and said portions are geometrically similar in shape.

3. The device, as set forth in claim 1, wherein said first member comprises a parallelogrammatic member having one side fixed.

4. The device, as set forth in claim 1, wherein said converting means includes at least two magnetic poles facing one another on opposite sides of said wire, and means for deriving an oscillatory current induced in said wire.

5. The device, as set forth in claim 1, wherein said frequency measuring means includes a gate for passing the output signal of said converting means for a predetermined time, a frequency multiplier for multiplying the frequency of the output signal of said gate, means for counting the number of cycles of the output signals of said multiplier, and means for calculating said frequency from the resultant count.

* * * * *